Dec. 21, 1926.

A. L. RUTHVEN 1,611,237

SIMPLEX TRAIN CONTROL

Filed March 9, 1923   3 Sheets-Sheet 1

FIG. 1.

Inventor:
A. L. RUTHVEN,
By Monroe E. Miller
Attorney.

Dec. 21, 1926.  
A. L. RUTHVEN  
1,611,237  
SIMPLEX TRAIN CONTROL  
Filed March 9, 1923  
3 Sheets-Sheet 2

Inventor:  
A. L. RUTHVEN,  
By Monroe E. Miller  
Attorney.

Patented Dec. 21, 1926.

1,611,237

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX TRAIN CONTROL.

Application filed March 9, 1923. Serial No. 623,871.

The present invention relates to train controlling apparatus, and aims to provide novel improvements in such apparatus to enhance the utility and efficiency thereof.

An object of the invention is the provision of a vehicle controlling equipment having a device responsive to magnetic and non-magnetic portions or sections of a traffic rail, with means for establishing vehicle retarding conditions at control stations of the track in cooperation with non-magnetic rail sections at such control stations, and the arrangement being such that such conditions are not established when passing short or long non-magnetic rail sections located between the control stations in the protected zone or located out of the protected portion of the track.

Another object of the invention is the utilization of a non-magnetic section of rail at each controlling station and inductive controlling means associated or assembled with said rail section, in combination with a vehicle equipment under the control of a responsive device to bring the vehicle equipment to an active condition when passing the non-magnetic rail section, and the same device being responsive to the controlling means to obtain vehicle stopping or retarding conditions when the track circuits are open.

A further object is the use of one or more iron or magnetic cores, as part of the track inductors, assembled or associated with the non-magnetic rail section, for obtaining different controlling conditions, for the inductive cooperation of the responsive device when passing along said rail section, to obtain predetermined vehicle controlling conditions, in combination with choke coils on said cores to prevent the responsive action of the vehicle equipment to the track inductors when the circuits of said coils are closed, so as to obtain clear conditions, but not when any of the track circuits are open.

A still further object of the invention is the provision of a vehicle equipment having means for effectively obtaining vehicle stopping or retarding conditions when passing the track inductors with their circuits open, and means for restoring clear conditions and for resetting the vehicle devices when passing the non-magnetic rail sections, clear conditions being restored when the track circuits are closed.

Another object is the provision of a vehicle equipment including means released when passing the non-magnetic rail sections, and means whereby the responsive device in passing a track inductor with its circuit open will effect a corresponding vehicle controlling condition in an efficient and reliable manner; and a further object, in this connection, is the provision of means whereby in passing different track inductors with their circuits opened, different vehicle controlling conditions are obtained accordingly.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

*Normal running circuit.*

The vehicle equipment includes an electro-magnet 11 which controls an air valve or other device, so that when said magnet is deenergized the brakes are applied, the steam, electrical or other power shut off, or both, so that such magnet must be kept energized in order that the locomotive or train can proceed. The circuit of the magnet 11 of the electro-pneumatic valve or other controlling device includes a direct current generator 12, or other source of electrical energy, a conductor 15, a switch member 16, a cooperating switch member 26, a conductor 27, the magnet 11, a switch 13 held closed by a danger electro-magnet 14, a conductor 27', a switch 28, a caution electro-magnet 29 holding the switch 28 closed, a conductor 20, a contact arm or brush 21 carried by a centrifugal speed control governor 25, a contact strip 22 normally engaged by the brush 21 when the governor is in operation, a conductor 23, and a safety switch 24. The separation of the switch members 16 and 26, the separation of the brush 21 and strip 22 by the stopping of the governor, the opening of the switch 24, or the accidental breaking, shorting or grounding of the energizing circuit of the magnet 29, will release the switch 28, and such switch in dropping open will enforce caution conditions in the vehicle equipment.

Another circuit, portions of which are in common with the circuit just described, includes the generator 11, conductor 15, switch member 16, a switch member 17, which is a twin to the switch member 26, a conductor 18, switch 13' carried by and insulated from the switch 13, the danger electro-magnet 14, conductor 20, brush 21, strip 22, conductor 23 and switch 24. The separation of the switch members 16 and 17, the separation of the brush 21 and strip 22, the opening of the switch 24, or the accidental breaking, shorting or grounding of the energizing circuit of the magnet 14, will release the switch 13 which will enforce danger conditions in the vehicle equipment. The switch member 17, conductor 18 and magnet 14 are in parallel with the switch member 26, conductor 27, magnet 11, switch 13, conductor 27', switch 28 and magnet 29.

The contact strip 22 is provided in order that the stopping of the governor 25 will open both circuits between the brush 21 and strip 22, inasmuch as the brush is moved below the lower end of the strip 22 when the governor stops. This will open the circuits to establish danger conditions, should the governor fail while the train is in motion. In order to prevent the circuit through the brush 21 and strip 22 being opened when the vehicle is intentionally stopped, means is provided for bridging the gap between said strip and brush when such intentional stop is made. Thus, a contact 30 is connected to the strip 22, and the brush 21 is connected electrically with the throttle lever or control member 31 of the locomotive or vehicle, whereby when said controlling member is returned to initial position to shut off the power, it engages the contact 30 and therefore forms a bridge between the brush 21 and strip 22. In this way, when the lever or member 31 is moved to shut off the power, for bringing the vehicle to a stop, said lever or member bridges the contact strip 22 and brush 21, so that when the governor is stopped by the stopping of the vehicle, the circuit will not be broken at this point. This will prevent the magnets 14, 29 and 11 from being deenergized when the train is stopped purposely, but if the train is started by moving the lever or member 31, and the governor 26 fails to operate to again raise the brush 21 into engagement with the strip 22, the circuit will remain open between the strip and brush. The lever or member 31 having been removed from the contact 30, will also open the circuit of the magnet 11, resulting in the magnet 11 being deenergized. The governor 25 must therefore be operating when the train is moving, and protection is therefore provided for the governor to assure of its operation. An intentional stop can be made without the train being locked against further movement inasmuch as the governor stops with the stopping of the train, but the throttle or controlling lever 31 being in initial position, during the non-movement of the train, eliminates the application of the brakes as would otherwise occur if the governor were not operating and the lever or member 31 moved to apply the power. When moving the lever or switch 31 to start the movement of the train or vehicle, said lever remains in engagement with the contact 30 for a short distance of movement of the lever 31 to keep the circuit between the brush 21 and conductor 23 closed through the switch 31 and contact 30 until the brush 21 again engages the strip 22.

*Caution speed control circuit.*

Caution conditions prevail in the equipment when the contact or switch members 16 and 26 are separated, to open the circuit of the caution magnet 29, so as to permit the switch 28 to drop open, said switch remaining open to enforce caution speed control until said switch is again closed. Under these conditions, the circuit of the magnet 11 includes a speed control shunt paralleling the switch 28 and magnet 29, which circuit is the caution speed control circuit. This circuit includes the generator 12, conductor 15, switch members 16 and 26 when they again contact with one another, conductor 27, magnet 11 (which is sufficiently slow-acting so as not to be completely deenergized when the switch members 16 and 26 are momentarily separated), switch 13, conductor 27', a conductor 32 connected between the switches 13 and 28, a contact strip 33 arranged to be engaged by the brush 21 when the vehicle is travelling below a predetermined speed (say from fifteen to thirty miles an hour or less), brush 21, strip 22, conductor 23 and switch 24. The strip 33 is of such a length that the brush 21 will be removed therefrom, to open such caution control circuit, when the allotted speed is exceeded, thereby deenergizing the magnet 11 to apply the brakes. Caution speed control therefore obtains when the switch 28 is open, compelling the completion of the circuit by way of the caution control contact strip 33 of the speed control device. If the speed of the vehicle, under such conditions, is exceeded, the brush 21 being lifted off the contact strip 33 will open the circuit of the magnet 11 and apply the brakes until the speed is reduced and the brush 21 returns to the strip 33.

*Danger speed control circuit.*

A more reduced speed is required under danger conditions than under caution conditions, and the train must be brought to a stop before it can proceed, after a danger indication is received by the vehicle equipment, this being brought about by the movement of the switch member 17 away from the switch member 16, to open the circuit of the danger magnet 14 so as to permit the switch 13 to drop open. A danger speed control is enforced when the switch 13 is open and will continue until said switch is again closed. The danger speed control circuit shunts the switch 13, switch 28 and magnet 29, and the switch 13 remaining open prevents the current passing through the conductor 32 and contact strip 33 of the caution speed control circuit, thereby keeping the caution speed control circuit open while danger conditions exist. The switch 13 being open also keeps the circuit of the magnet 14 open even though the switch members 16 and 17 again come into contact with one another. Thus, when the switch 28 is open, caution conditions prevail, and when the switch 13 is open, danger conditions prevail. The danger speed control circuit includes the generator 12, conductor 15, switch member 16, switch member 26, conductor 27, magnet 11 (which is slow-acting so as not to be completely deenergized when the switch members 16 and 26 are momentarily separated), conductor 34, an electro-magnet 35, a switch 36 under the influence of said magnet 35, a contact 37, a conductor 38, a contact 39, the brush 21 with the governor stopped, switch 31, contact 30, conductor 23 and switch 24. Such circuit is only closed when the vehicle has been brought to a stop, to bring the brush 21 against the contact 39, said brush and contact only engaging one another when the governor has come to a complete stop. The danger speed control circuit changes, when the vehicle has been brought to a stop, so as to permit the vehicle to proceed at a slow speed (say from five to twelve miles per hour). A contact strip 42, shorter than the contact strip 33, is arranged to be engaged by the brush 21 when the train is travelling under the maximum danger speed, and when the magnet 35 is energized, the switch 36 is disconnected from the contact 39, by being moved from the contact 37 against the opposite contact 40, the contact 40 and contact strip 42 being connected by a conductor 41. The danger speed control circuit now includes the generator 12, conductor 15, switch member 16, switch member 26, conductor 27, conductor 34, magnet 35, switch 36, contact 40, conductor 41, contact strip 42, brush 21, strip 22, conductor 23 and switch 24. The vehicle can then proceed below the maximum danger speed, the brush 21 sliding upward on the strip 42, and if such speed is exceeded, the brush 21 is removed from the strip 42, which will not only deenergize the magnet 11, and apply the brakes, but which will also deenergize the magnet 35, letting the switch 36 drop away from the contact 40 back against the contact 37. This will open the circuit through the contact strip 42, thereby keeping the brakes applied until the train is again brought to a stop to return the brush 21 to the contact 39, in which event the switch 36 is again lifted into connection with the contact strip 42 so that the vehicle can proceed again under danger speed control. A stop will be enforced, however, whenever the danger speed is exceeded under these conditions.

The danger speed control prevails whenever the switch 13 is open, because the switch 13' keeps the circuit of the magnet 14 open, so that said magnet cannot be reenergized excepting through some other route for the current.

The speed permitted under danger conditions is sufficiently slow to enable a quick stop to be made, but the train can proceed, should the apparatus be out of commission or other contingencies exist, for otherwise the train might be locked against any advance movement with the brakes set.

*Responsive vehicle controlling means.*

The switch member 16 is pivoted or hinged to swing down by gravity when released, and carries a plate 43 which is insulated from the switch member, and said plate has an armature 43' thereon normally attracted upward toward and supported by an alternating current electro-magnet 44. The magnet 44 is disposed in the circuit 45, which includes another alternating current electro-magnet 46 holding the switch 24 closed, the windings of the magnets being such that the armature 43' is released when the magnet 44 is partially deenergized, while the switch 24 is only released when the magnet 46 is substantially completely deenergized. Such circuit also includes a responsive element or device, which comprises a transformer, including the secondary coil or winding 47 in the circuit 45 and disposed on a core 48 on which the primary coil or winding 49 is also disposed. Said core is mounted on the vehicle above or adjacent to one of the traffic rails, with its ends or poles directed toward the rail, so that when the transformer or responsive element is moving along the iron or magnetic portion of the rail, the rail completes the magnetic circuit of the transformer between the ends of the core 48, whereas when the transformer moves along a non-magnetic rail section, such magnetic circuit is interrupted or broken between the ends of the core 48, thereby increasing the impedance in the core 48. The primary winding 49 is connected by the conductors 50 in circuit with an alternating or changing current generator 51, which may be driven as a unit with the generator 12, and the winding 49 being energized will induce current in the secondary winding 47 and circuit 45 to energize the magnets 44 and 46. Said magnets receive maximum energy when the core 48 is moving along an iron or magnetic portion of the rail, but when it moves along a non-magnetic rail section, the magnetic impedance in the transformer will materially reduce the flow of current in the circuit 45, and the magnet 44 is deenergized sufficiently to release the armature 43'. The magnet 46 is a safety magnet and only releases the switch 24 when the current in the circuit 45 is decreased below a sufficient voltage to assure of the response of the armature 43' to variations of current in the magnet 44. Thus, if either of the alternating current circuits fail, due to the breakage of a wire, a short or ground, or the like, so that the magnet 44 could not be reenergized for picking up or holding the armature 43', then the magnet 46 will be deenergized to release the switch 24 and open the normal running circuit, thereby obtaining danger conditions. The magnet 46 is thus used in the alternating current circuit 45 to assure of the responsive means being in operative condition, for otherwise the normal running circuit is opened. Thus, when the responsive element or transformer moves along an iron or magnetic portion of rail the magnet 44 is energized sufficiently to hold or support the armature 43' and other parts supported therefrom, and when said element or transformer moves along a non-magnetic rail section, the magnet 44 is deenergized sufficiently so as not to be able to support said armature 43'.

*Track control elements.*

A non-magnetic rail section 52 of manganese bronze or other non-magnetic material, is provided at each control station of the track, so that when the responsive element or transformer of the vehicle equipment moves along said rail section 52, the magnet 44 is deenergized to release the armature 43', thereby obtaining such releasing action whenever passing a control station. Said non-magnetic rail section 52 provides the primary control element.

Associated with or attached to the non-magnetic section 52 are secondary control elements, comprising the inductors 53 and 54, each of which includes a core 55 of iron or other magnetic material and a choke coil or winding 56 thereon. Said inductors are disposed at one side of the rail section 52, with the ends or poles of the cores 55 extending toward and substantially flush with the tread of the rail section, and said cores are preferably of such shape to fit the side of the rail section and are preferably secured rigidly to said rail section. The inductors can thus be assembled with the rail section 52, to provide for minimum clearance between the track inductors and the responsive element or transformer of the vehicle, without physical contact between them. Said control and responsive elements being associated with the rail do not constitute objectionable obstructions on the track or vehicle, and are not apt to be knocked off or interfered with.

The inductors 53 and 54 are arranged at suitable longitudinally spaced points of the rail section 52, and are preferably spaced equal distances from one another and from the ends of said rail section.

The coils or windings 56 of the inductors 53 and 54 are disposed in the respective circuits 57 and 58 with the switches 59 and 60 that are held closed by the corresponding track electro-magnets 61 and 62. The magnets 61 and 62 are located in the corresponding circuits of the wayside signal or semaphore apparatus, whereby under clear conditions both magnets 61 and 62 are energized to hold the switches 59 and 60 closed; both magnets 61 and 62 being deenergized under danger conditions, to open the switches 59 and 60; and the magnet 61 being deenergized and the magnet 62 energized for caution conditions, with the switch 59 open and the switch 60 closed. However, danger conditions may also exist with the magnet 62 deenergized and the switch 60 opened, even though the magnet 61 is energized and the switch 59 closed inasmuch as the switch members 16 and 17 will be separated although the switch members 16 and 26 were not separated, but it is preferable to have both switches 59 and 60 open under danger conditions. Danger conditions are also established by the opening, shorting or grounding of the track circuits so as to render the coils 56 ineffective.

When the core 49 of the responsive element or transformer moves along the non-magnetic rail section 52, with the magnet 44 partially deenergized, the core 48 in passing a track core 55 will result in the track core completing the magnetic circuit of the core 48, said cores 48 and 55 cooperating with their ends close together. Thus, the magnetic impedance in the core 48 is momentarily decreased, so as to increase the current in the circuit 45, and the magnet 46 is reenergized. However, if the circuit of the corresponding choke coil 56 is closed, the coil will create a choking action so as to impede the flow of alternating magnetic flux from the core 48 through the core 55, thereby creating sufficient magnetic impedance to prevent the flow of current in the circuit 45 being increased materially while moving along the non-magnetic rail section past a track inductor with the circuit of the inductor closed. In this way, the circuits of the track inductors being closed, the effect is the same as though the track inductors were not present when the responsive element or device of the vehicle moves along the non-magnetic rail section past the track inductors, whereas if the circuits of the track inductors are opened, either intentionally or accidentally, the effect is felt by the responsive element of the vehicle, when passing the cores 55, by the momentary increase of current in the circuit 45 and magnet 44 thereof.

The reduction in current in the circuit 45 and magnet 44, when reaching a non-magnetic rail section, is used to release the armature 43' and other elements of the vehicle equipment, and the effect of the track inductors, with their circuits open, is used to obtain either caution or danger conditions in the vehicle equipment accordingly.

*Caution and danger establishing devices.*

The twin switch members 17 and 26, which cooperate with the common companion switch member 16, are pivotally or hingedly supported above the switch member 16, and each of the switch members 17 and 26 has an electrical contact with the switch member 16 for the flow of current through the respective magnets 14 and 29. Armatures 63 are carried by and preferably insulated from the switch members 17 and 26 and are disposed between the pole of the magnet 44 and the armature 43' of the switch member 16, for the attraction of the armatures 63 toward the magnet 44 away from the switch member 16, when the switch members 17 and 26 are released while the switch member 16 is down. The armatures 63 and switch members 17 and 26 are light in weight, so that said armatures 63 can be picked up by the magnet 44 without fail when said magnet is energized above the minimum energization which obtains when the core 48 of the responsive element is moving along a non-magnetic portion of the rail.

The switch members 17 and 26 are normally locked to the switch member 16 by means of catches or hooks 64 and 65, respectively, pivoted in slots in the plate 43 and projecting upwardly at an acute angle from the plate to engage the free ends of said switch members 26 and 17, respectively. Said catches have the arms 66 and 67, respectively, projecting below the plate 43, and providing weights for swinging the catches into engagement with the switch members 26 and 17, and said arms 66 and 67 extend different distances below the plate 43 to contact in succession with the upper surface of a block or enlargement 68 that is disposed below the plate 43. Thus, when the armature 43' is released from the magnet 44 and the plate 43 swings downward, the arm 66 will first contact with the block 68, to swing the catch 64 out of engagement with the switch member 26, and then, when the plate moves downwardly further, the arm 67 will similarly contact with the block 68 and swing the catch 65 out of engagement with the switch member 17. The switch members 26 and 17 are thus released in succession from the switch member 16 during the downward movement of said main switch member 16.

If, when the switch member 16 is released from the magnet 44 and moves down, the magnet 44 is not reenergized until the switch member 16 is again raised, the switch members 17 and 26 will remain in contact with the switch member 16, to keep the circuits of the magnets 14 and 29 closed. If, when the switch member 16 is released and has moved down part way to disengage the catch 64 from the switch member 26, the magnet 44 is reenergized, the switch member 26 will be raised by the reenergized magnet 44, to open the circuit of the magnet 29 and thereby release the switch 28, but the switch member 17 remaining locked to the switch member 16 cannot be raised by the magnet 44, the reenergization of the magnet 44 not being sufficient to restore the switch member 16 when said switch member 16 has been released and moved downwardly. If, when the switch member has moved down further so as to release both catches 64 and 65 from the switch members 26 and 17, respectively, the magnet 44 is reenergized, both switch members 17 and 26 will be raised away from the switch member 16, to open the circuits of the magnets 14 and 29, thereby releasing the switches 13 and 28. As hereinbefore noted, the opening of the switch 28 will produce caution conditions, and the opening of the switch 13 will produce danger conditions, but if the switch member 16 is returned to its raised position to be held by the reenergized magnet 44, without said magnet having been reenergized during the time that the switch member 16 was in a lowered position, then clear conditions will exist.

Synchronizing device.

When the responsive device reaches a nonmagnetic rail section 52, so as to deenergize the magnet 44 and release the switch members 16, 17 and 26, the downward movement of the switch member 16 is retarded to be in proportion to the movement of the vehicle, whereby the switch member 26 is released from the switch member 16 when the responsive device passes over the inductor 53, and whereby the switch member 17 is not released until the responsive device has passed the inductor 53, but before the responsive device passes the second track inductor 54.

Figure 2:
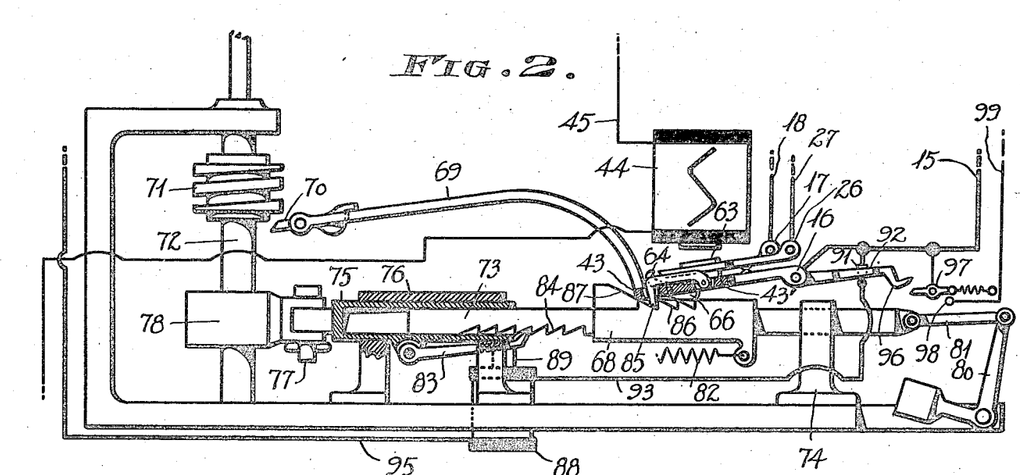
Fig. 2 is a fragmentary diagrammatical view of the vehicle equipment showing the several parts in released position, preparatory for a responsive action from the track controlling devices or inductors.
Figure 3:
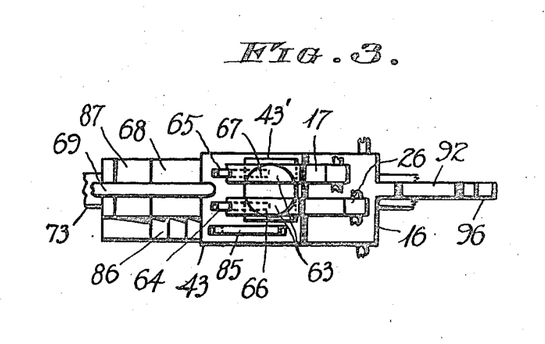
Fig. 3 is a plan view in detail on the line 3—3 of Fig. 1.
Figure 4:
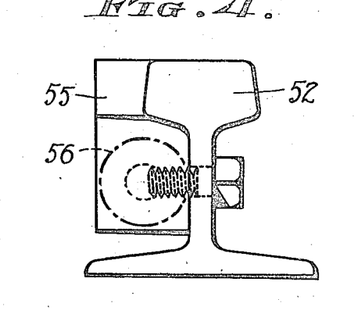
Fig. 4 is an enlarged end view of one of the track inductors assembled with the non-magnetic rail section.

A synchronizing device accomplishes this result, by restricting or retarding the downward movement of the switch member 16 in accordance with the speed and distance of travel of the vehicle. The plate 43 of the switch member 16 has an arm 69 carrying a pivoted dog 70 which, when the switch member 16 is in normal position, is disposed above a worm or helix 71 on a vertical shaft 72 that is connected to a wheel, axle or other member that rotates in proportion to the distance and speed of movement of the vehicle. When the switch member 16 is released, the dog 70 drops on the worm or helix, which rotates in the same direction in either direction of movement of the vehicle, and the downward movement of the switch member 16 is thus retarded whereby the catch 64 is not disengaged from the switch member 26 until the vehicle has travelled a distance almost equal in length to the distance between the entrance end of the rail section 52 and the inductor 53. The switch member 26 is thus unlocked from the switch member 16 just before the responsive device passes over the inductor 53, and after the responsive device has passed the inductor 53, the dog 70 is disengaged from the worm or helix, as seen in Fig. 2, whereby the catch 65 is also disengaged from the switch member 17. When the switch member 16 is raised, the dog 70 can swing downwardly relatively to the arm 69 so that the dog can pass the convolutions of the worm or helix and again be brought to a position above said worm or helix.

The speed control governor 25 is operated from the shaft 72, thereby assuring of the helix 71 being operable when the governor is turning, and should the operative connection between the helix and driving member be broken, the governor would stop so as to remove the brush 21 from the strip 22 and open the normal running circuit. The helix 71 must therefore be rotating in order that the governor can rotate, thereby protecting the synchronizing or run-down device.

Restoring device.

The vehicle equipment includes a device for restoring or resetting the switch member 16 when the responsive device leaves the non-magnetic rail section 52. This restoring device includes a reciprocatory bar or slide 73 carrying the block 68 between the ends thereof, and having its rear terminal slidable in a guide 74 and its forward terminal slidable within a reciprocatory actuator 75 movable in a guide 76. The bar or slide 73 is disposed under the switch member 16, and when the switch member 16 is released and moves downwardly, the plate 43 rests on the block or member 68, as seen in Fig. 2. The actuator 75 is constantly reciprocated during the movement of the vehicle. Thus, the actuator 75 has a pivotal connection 77 with a band 78 surrounding an eccentric 79 on the shaft 72.

The slide 73 is normally moved rearward and held in its rearmost position by means of a weighted lever 80 connected to the free end of the slide 73 by a link 81, and the weight can be assisted by a spring 82, if desired, to assure of quicker action.

The slide 73 is stepped forwardly, while the responsive device is passing the non-magnetic rail section 52, and said slide is advanced by the actuator 75 which has a pawl 83 pivoted thereto to engage ratchet teeth 84 with which the slide 73 is provided. Said pawl 83 normally gravitates away from the ratchet teeth 84, so that the reciprocation of the pawl 83 will not advance the slide 73 forwardly. However, when the pawl 83 is raised into engagement with the ratchet teeth 84, the slide 73 will be moved forwardly by the actuator 75.

In order to hold the slide 73 when moved forwardly by the actuator 75, a holding pawl 85 is carried by the plate 43, being pivoted to rest on said plate and having its active terminal extending down through an opening in the plate. The block or member 68 of the slide has a series of ratchet teeth 86 for the engagement of the pawl 85, when the plate 43 is released and moved downwardly, so that when the pawl 83 moves the slide 73 forwardly, said slide will be held by the pawl 85, and the slide is thus moved forwardly one step for each revolution of the shaft and eccentric 79. The block 68 has an inclined cam 87 to be brought into engagement with the end of the plate 43, when the slide has been moved forwardly a number of steps, whereby the cam will raise the plate 43 and restore the switch member 16 so that its armature 43' can be held by the reenergized magnet 44.

The pawl 83 is held in active position by the core 89 of a solenoid 88 when said core is raised by the energization of said solenoid, the pawl 83 resting on said core. The circuit of the solenoid 88 is normally open, and is only closed when the switch member 16 is released. Thus, an insulated switch 92 is carried by the switch member 16 to engage a contact 91 when the switch member 16 has moved downwardly a slight distance, and the contact 91 is connected to the conductor 15 leading from the generator 12. The terminals of the solenoid 88 are connected by the conductors 93 and 95 with the switch 92 and conductor 23, respectively, and the circuit of the solenoid 88 when the switch 92 engages the contact 91, includes the generator 12, conductor 15, contact 91, switch 92, conductor 93, solenoid 88, conductor 95, conductor 23 and switch 24. The core 89 is raised when the solenoid 88 is energized, thereby holding the pawl 83 in engagement with the ratchet teeth 84. The switch member 16 having moved down will enable the pawl 85 to engage the ratchet teeth 86 for holding the slide 73 as it is moved forwardly step by step. When the slide has moved forwardly a predetermined number of steps, the cam 87 will raise the plate 43 and restore the switch member 16.

*Speed control termination.*

The speed control of the vehicle is terminated when the responsive device has reached the non-magnetic rail section 52 and is approaching the first inductor 53. A tripper 96 is carried by and insulated from the switch 92 so as to move with the switch member 16, and when the switch member 16 moves downwardly said tripper engages and moves a tripping switch 97, to move the switch 97 against a contact 98 before the responsive device reaches the inductor 53. The switch 97 is connected to the conductor 15, and the contact 98 has a branched conductor 99 leading therefrom and connected between the magnet 14 and switch 13' and between the switch 28 and magnet 29. The switch 97 and conductor 99 provide shunts, one shunt being parallel with switch members 16 and 17 and switch 13', and the other shunt being in parallel with the switch members 16 and 26 and switch 28. Therefore, when the switch 97 is closed, there is completed a circuit including the generator 12, conductor 15, switch 97, contact 98, conductor 99, magnets 14 and 29 in parallel, conductor 20, brush 21, contact strip 22, conductor 23 and switch 24. The magnets 14 and 29 are thus energized to pick up and close the respective switches 13 and 28 to terminate either caution or danger conditions prior to the movement of the responsive device over the first inductor 53, so that a caution or a danger condition can be immediately established again if the track inductors are controlled accordingly.

*Operation—Clear conditions.*

Figure 1:
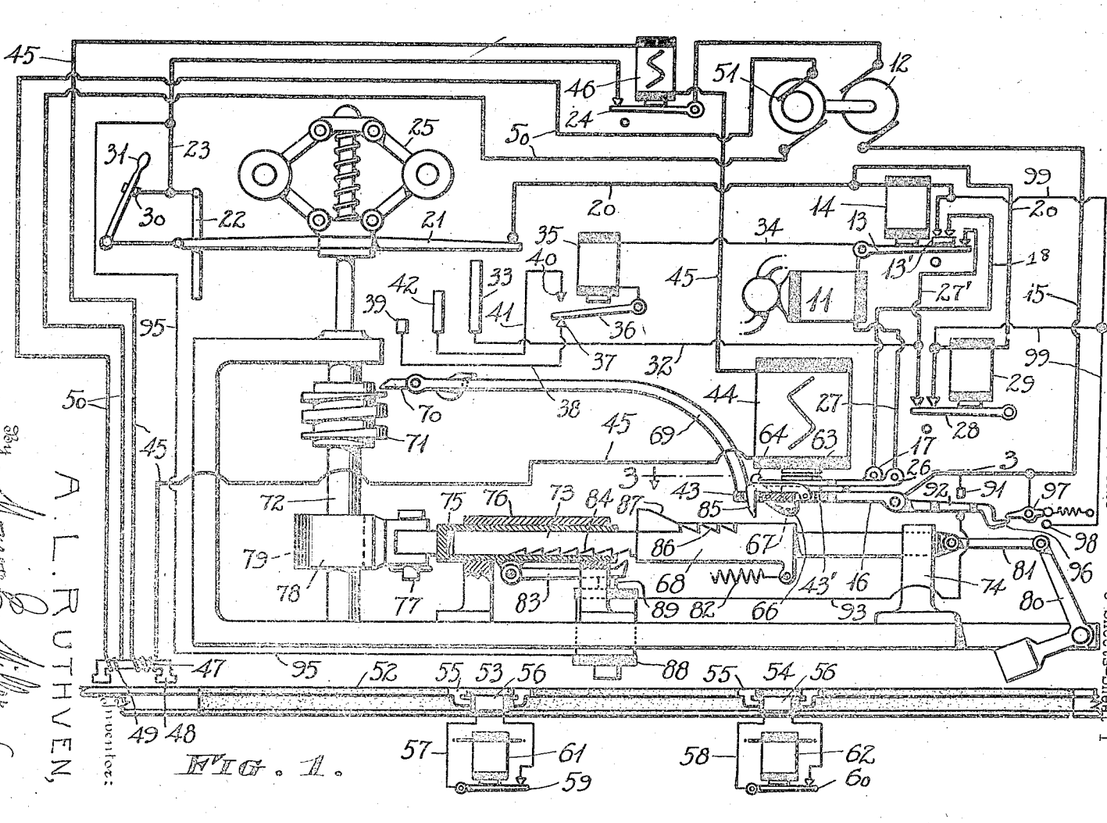
Figure 1 is a diagrammatical view of the apparatus.

With the train proceeding under clear conditions, the normal running circuit including the magnet 29 is closed, and the circuit including the magnet 14 is also closed, as hereinbefore described, and as shown in Fig. 1. The core 48 moving along the iron or magnetic portion of the rail will also result in the circuit 45 and magnet 44 receiving maximum current by induction between the coils or windings 47 and 49 of the responsive transformer.

When the core 48 passes from the magnetic portion of the rail to the non-magnetic rail section 52, the magnetic circuit of the core 48 being interrupted between the ends of said core, will result in the increased magnetic impedance in the core 48 reducing the induction of current in the circuit 45, so that the magnet 44 is sufficiently deenergized to release the armatures 43' and 63. Consequently, the switch member 16 drops and the dog 70 falls on the helix 71 and moves downwardly, following the convolutions of the helix, so as to synchronize the downward movement of the switch member 16 with the movement of the responsive device along the rail section 52. When the vehicle has moved a sufficient distance so that the responsive device approaches close to the first inductor 53, the switch member 16 will have moved downwardly sufficiently so that the arm 66 rests on the block 68 to disengage the catch 64 from the switch member 26, and the switch 92 will also be brought into engagement with the contact 91. Furthermore, such movement will cause the tripper 96 to trip and close the switch 97, whereby if the vehicle approaches the control station under speed control, the magnets 14 and 29 are energized, before the responsive device passes the first track inductor, to eliminate or terminate the speed control before the conditions are established for the next block. This termination of speed control occurs when passing a control station with the responsive device approaching the first track inductor 53. Thus, during the downward movement of the switch member 16, the tripper 96 closes the tripping switch 97, and the circuit controlled thereby includes the generator 12, conductor 15, switch 97, contact 98, conductor 99, magnets 14 and 29 in parallel, conductor 20, brush 21, contact strip 22, conductor 23, and switch 24. Either or both of the switches 13 and 28 are therefore closed, preparatory for the establishment of a caution or a danger condition or the establishment of a clear condition for the next block. When the switch member 16 has moved downwardly with the responsive device approaching the first track inductor 53, the pawl 85 also bears on the block 68, and the solenoid 88 is energized by the engagement of the switch 92 with the contact 91, the circuit including the generator 12, conductor 15, contact 91, switch 92, conductor 93 (which is permanently connected to the switch 92 and flexible or extensible to permit the switch to move), solenoid 88, conductor 95, conductor 23, and switch 24. The pawl 83 is therefore raised into engagement with the ratchet teeth 84, and the reciprocation of the actuator 75 and pawl 83 will, by ratchet action, move the slide 73 forwardly step by step, the pawl 85 in engaging the successive ratchet teeth 86 holding the slide 73 in its successive positions, the cam 87 being brought closer and closer toward the plate 43, as the responsive device moves along the non-magnetic rail section 52.

When the responsive device passes the track inductor 53, with the circuit 57 closed, the magnet 61 being energized, the alternating magnetic flux in the core 48 will attempt a freer path through the core 55 of the inductor 53, than through the air gap, but the coil 56 of the circuit 57 will provide a choking action in the inductor 53, thereby impeding the flow of alternating magnetic flux through the core of the inductor 53, and thereby maintaining the impedance in the responsive device or transformer, so as to prevent the reduced current in the circuit 45 and magnet 44 being materially increased. Consequently, the caution switch member 26, although released from the switch member 16, will not be raised by the magnet 44. Thus, the catch 64 has released the switch member 26 from the switch member 16, but said switch member 26 will remain in circuit closing relation to the switch member 16.

When the responsive device has passed the inductor 53 and approaches the second inductor 54, the switch member 16 moving down further independent of the movement of the vehicle (the dog 70 having become disengaged from the worm 71) will bring the arm 67 into contact with the block 68 of the slide 73, thereby disengaging the catch 65 from the switch member 17, the plate 43 coming to rest on the block 68, as seen in Fig. 2. However, the circuit 58 of the track inductor 54 being closed, will result in the same action as when the responsive device passed the track inductor 53, to maintain the partial deenergization of the magnet 44 when the responsive device passes the second track inductor with its circuit closed. Consequently, although both switch members 17 and 26 are disengaged by their catches, said switch members will not be raised by the magnet 44 which remains partially deenergized. During the travel of the responsive device along the rail section 52 past the track inductors, the slide 73 is being moved step by step, and when the responsive device passes from the track inductor 54 to the exit end of the rail section 52, the cam 87 is moved against the plate 43 and raises said plate, so as to restore the switch member 16 to normal raised position, so that when the core 48 again moves over the iron or magnetic portion of the rail, to reenergize the magnet 44, the switch member 16 will be held by said magnet 44. The arms 66 and 67 being raised from the slide 73 will result in the catches 64 and 65 again engaging and holding the switch members 26 and 17, respectively, and this occurs before the magnet 44 is reenergized or before the responsive device reaches the magnetic portion of the rail beyond the rail section 52. The switch member 16 being raised by the cam 87 will remove the switch 92 from the contact 91, to deenergize the solenoid 88 and let the pawl 83 drop away from the ratchet teeth 84, and the pawl 85 having been raised away from the ratchet teeth 86, will let the slide 73 move to normal position under the influence of the weighted lever 80 and spring 82, the release of the slide 73 occurring when the plate 43 is raised by the cam 87 and the responsive device then reaches the magnetic portion of the rail so that the magnet 44 holds the armature 43' and other parts.

The train can then proceed under clear conditions, opportunity having been given, when passing the control station, for the track inductors to act for opening the circuits of the magnets 14 and 29, but the circuits of the track inductors being closed having avoided the production of either caution or danger conditions.

*Caution conditions.*

Under caution conditions, the circuit 58 is closed and the circuit 57 is open, the magnet 61 being deenergized while the magnet 62 remains energized to avoid a danger condition being established.

The same actions take place, as under clear conditions, while the responsive device is moving along the rail section 52 and approaching the track inductor 53, the catch 64 being disengaged from the switch member 26 by the contact of the arm 66 with the block 68, the switch 97 having been tripped to terminate the speed control if it existed, and the switch 92 being engaged with the contact 91 to bring the pawl 83 in engagement with the ratchet teeth 84, so that the slide 73 is being stepped to move the cam 87 toward the plate 43. When the responsive device passes the inductor 53, with the circuit of the choke coil 56 thereof open, the magnetic flux from the core 48 has a free passage through the core 55 of the inductor 53, whereby the momentary increase in the flow of magnetic flux through the core 48 will induce more current in the circuit 45, thereby reenergizing the magnet 44 sufficiently to pick up the armature 63 of the switch member 26, such pick-up being effected quickly and with a slight increase in current in the magnet 44, so as to assure of such action taking place when the circuit 57 is open. The switch member 26 is therefore moved away from the switch member 16, and this will open the normal running circuit including the magnet 29, and said magnet being deenergized will release the switch 28. The switch 28 being opened, will establish the caution speed control circuit, as will be described presently. When the responsive device passes the second track inductor 54, with the switch member 17 unlocked, the choking action of the coil 56 of said inductor, will keep the circuit 45 and magnet 44 thereof sufficiently deenergized so as not to raise the switch member 17 away from the switch member 16. The cam 87 restores the switch member 16 as hereinbefore described, when leaving the rail section 52, and all parts are restored to normal position, excepting the magnet 29 which remains deenergized with the switch 28 open, to enforce caution speed control.

The circuit of the magnet 11 now includes the generator 12, conductor 15, switch member 16, switch member 26 (said switch members again contacting as soon as the responsive device has passed the inductor 53), conductor 27, slow acting magnet 11, switch 13, conductor 27', conductor 34, contact strip 33, brush 21 with the vehicle travelling below the maximum caution speed, contact strip 22, conductor 23 and switch 24. The magnet 29 is quick acting so as to become de-energized the instant that the switch members 16 and 26 are separated, but the magnet 11 is slow-acting so as not to be completely deenergized even though said switch members are momentarily separated, thereby requiring a longer separation of said switch members for said magnet 11 to become deenergized. If the train is travelling above the maximum caution speed, with the brush 21 above the strip 33, the magnet 11 will be deenergized until the speed is reduced to the required amount. Therefore, as long as the train proceeds below the maximum caution speed, with the brush 21 on the strip 33, the magnet 11 will remain energized with the brakes released, but such speed cannot be exceeded.

The speed control is terminated when reaching the next control station, by the tripping of the switch 97 as hereinbefore described.

*Danger conditions.*

Under danger conditions, the circuit 58 is open, and the circuit 57 may or may not be open inasmuch as the caution switch member 26 need not be separated from the switch member 16 to obtain danger conditions.

Thus, when passing a control station, with the circuit 58 open, both switch members 17 and 26 having been released from the switch member 16, the effect of the coil 56 of the inductor 54 being absent, will result in the increase of current in the circuit 45 and magnet 44 by the momentary free flow of magnetic flux from the core 48 through the core 55 of the inductor 54, so as to pick up the switch member 17 and also the switch member 26. If the circuit 57 is open, the switch member 56 would have been picked up when passing the inductor 53, to establish a caution condition prior to the establishment of a danger condition. However, in either event, the switch member 17 being lifted away from the switch member 16, will open the circuit of the magnet 14, to let the switch 13 drop open. The several parts are restored to normal position, as before, when leaving the control station, but the magnets 14 and 29 remain deenergized with the switches 13 and 28 open.

The circuit of the magnet 11 now includes the generator 12, conductor 15, switch members 16 and 26 restored to normal position, conductor 27, conductor 34, magnet 35, switch 36, contact 37, conductor 38, contact 39, brush 21, switch 31, contact 30, conductor 23 and switch 24. This circuit will remain open until the train is brought to a stop so as to bring the brush 21 against the contact 39, thereby enforcing a complete stop of the train before it can proceed again. When the train has stopped, the circuit last referred to being closed will energize the magnet 11 to release the brakes, and the magnet 35 is also energized to transfer the circuit connections from the contact 39 to the contact strip 42, and the circuit now includes, between the conductor 34 and brush 21, the magnet 35, switch 36, contact 40, conductor 41 and contact strip 42. It will be understood that when the lever or throttle 31 is moved to start the vehicle or train, said lever remains in engagement with the contact 30 during a short distance of movement of the lever to keep the circuit through the lever 31 and contact 30 closed until the brush 21 again engages the strip 22. The train can therefore proceed below a maximum danger speed, with the brush 21 on the strip 42 to keep the circuit closed as long as the maximum danger speed is not exceeded. However, if such speed is exceeded, the circuit being opened between the brush 21 and strip 42, will not only deenergize the magnet 11 but will also deenergize the magnet 35, and the switch 36 will drop from the contact 40 against the contact 37, thereby removing the strip 42 from the circuit, and again enforcing another stop before the train can proceed. Therefore, under danger conditions whenever the maximum danger speed is exceeded, a complete stop must be made before the train can proceed again.

When proceeding through a block under danger speed control, such control is terminated when passing the next control station, as hereinbefore described.

*Passing other non-magnetic rail sections.*

The responsive device of the vehicle equipment can pass other non-magnetic rail sections without producing caution or danger conditions.

When passing short non-magnetic rail sections, such as manganese bronze crossings, frogs, switch points, and the like, which are considerably shorter than the distance between the inductor 53 and the corresponding end of the rail section 52, the responsive device is only over the non-magnetic section for a short interval of movement of the vehicle, so that the switch member 16 has not moved down appreciably, and the armature 43' is again attracted by the magnet 44. In other words, the non-magnetic crossings, switch points, frogs and the like, are so short that the switch member 16 does not have an opportunity of moving downwardly sufficiently to remove the armature 43' from attractive relation with the magnet 44, and the magnet being reenergized immediately will again hold the armature 43' in normal position, the switch member 16 being lifted right back to normal position.

The vehicle equipment can also pass non-magnetic rail sections of any length either in the protected portion of the track or out of the protected zone. Thus, when passing long non-magnetic rail sections, the magnet 44 is deenergized, and the switch members 16, 17 and 26 are moved to lowermost position and the slide 73 is moved step by step to bring the cam 87 to a position so as to raise the plate 43 and switch member 16, so that when the responsive device again returns to an iron or magnetic portion of the rail, to reenergize the magnet 44, the armature 43' will be in a position to be attracted and held by said magnet, without caution or danger conditions being established in the meantime while moving along the non-magnetic rail section. It will be noted that when the cam 87 raises the plate 43, to remove the switch 92 from the contact 91 and thereby release the pawl 83 from the ratchet teeth 84, the pawl 85 being raised from the ratchet teeth 86, will release the slide 73, but the pawl 85 being lowered by the partial withdrawal of the cam 87 from the plate 43, will catch the ratchet teeth 86 nearest the cam 87, so that the slide 73 can only be moved one step toward normal position, and the switch 92 again engaging the contact member 91 will render the pawl 83 active to again move the slide 73 so that the cam 87 raises the plate 43. This oscillatory motion of the plate 43 and slide 73 continues until the responsive device reaches a magnetic portion of rail, when the magnet 44 being reenergized will attract and support the armature 43' and other parts supported therefrom. This will permit the slide 73 to return to normal position.

The vehicle equipment can thus pass short and long non-magnetic rail sections without obtaining caution or danger conditions, and without using inductors or other devices along said non-magnetic rail sections, excepting at the control stations.

*Modification.*

Figure 5:
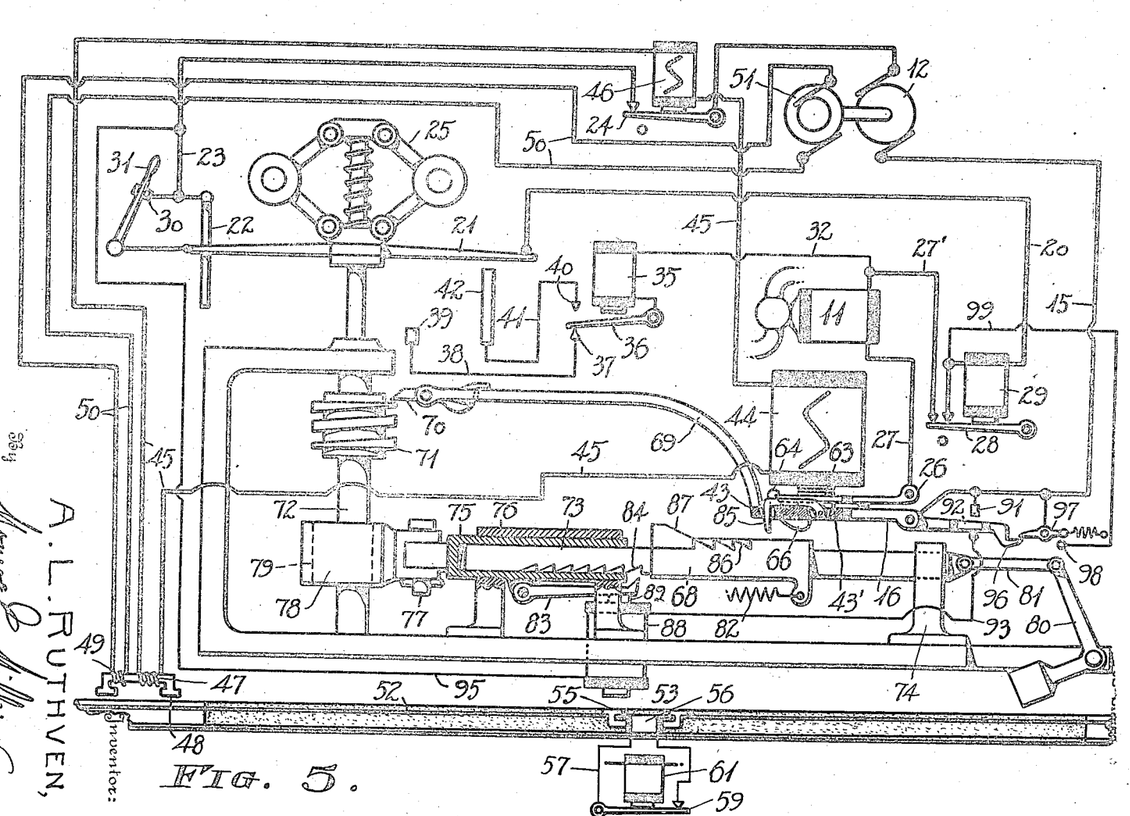
Fig. 5 is a diagrammatical view, similar to Fig. 1, showing a modification.

Fig. 5 illustrates a modified apparatus which is for two conditions only, instead of three conditions as in the first form of apparatus. Thus, instead of providing for clear, caution and danger conditions as in the first form of apparatus, the modified arrangement provides for clear and danger conditions only. Consequently, the switch member 17, conductor 18, switch 13', magnet 14, switch 13 and other corresponding elements are eliminated, and the normal running circuit is substantially the same as in Fig. 1, and includes the generator 12, conductor 15, switch member 16, switch member 26, conductor 27, magnet 11, conductor 27', switch 28, magnet 29, conductor 20, brush 21, contact strip 22, conductor 23 and switch 24.

A single inductor 53 is associated with the non-magnetic rail section, intermediate the ends thereof, so that when the responsive element passes over the inductor 53, with the circuit 57 open, the reenergization of the magnet 44 will lift the switch member 26 from the switch member 16, the catch 64 having been disengaged from the switch member 26 the same as in the first form of apparatus, and will open the circuit of the magnet 29, so as to deenergize the magnet 29 and let the switch 28 fall open. If the circuit 57 is closed, no response will be received in the vehicle equipment such as to separate the switch members 16 and 26, and the several devices are restored to normal position the same as in the first form of apparatus.

When the switch 28 is opened, the train must come to a stop, which will complete the circuit including the generator 12, conductor 15, switch members 16 and 26 when again brought into engagement, conductor 27, magnet 11, conductor 32, magnet 35, switch 36, contact 37, conductor 38, contact 39, brush 21, switch 31, contact 30, conductor 23 and switch 24. When the train has come to a stop to reenergize the magnet 11, the magnet 35 being energized will raise the switch 36 to disconnect the contact 39 from the circuit and to connect the contact strip 42 in the circuit, permitting the train to proceed below a maximum danger speed, the same as in the apparatus shown in Fig. 1, the train being again stopped if such maximum danger speed is exceeded, substantially the same as in the first form of apparatus. Speed control is terminated when reaching the next control station, by the tripping of the switch 97, which reenergizes the magnet 29 to close the switch 28, thereby keeping the brakes released even though the brush 21 is removed from the contact strip 42.

Having thus described the invention, what is claimed as new is:—

1. Vehicle controlling apparatus including a non-magnetic section in the track at each control station, a vehicle-carried responsive device in inductive relation with the track, a control inductor on the track at each control station associated with the non-magnetic track section adapted to be rendered effective and ineffective, and means controlled by the responsive device to be brought to an operative condition whenever the responsive device moves along a non-magnetic track section and, after such operative condition is established to establish a predetermined vehicle condition if the responsive device is responsively affected by said inductor.

2. Vehicle controlling apparatus including a non-magnetic section in the track at each control station, a vehicle-carried responsive device in inductive relation with the track, means arranged to be released when said responsive device moves along a non-magnetic track section, a control inductor on the track at each control station associated with the non-magnetic track section and including a magnetic member with which said responsive device is cooperable when moving along the non-magnetic track section and means for rendering the magnetic member effective and ineffective, and means controlled by the responsive device to be brought to an operative condition by the release of the firstnamed means and to establish a predetermined vehicle condition when the responsive device is responsively affected by said inductor.

3. Vehicle controlling apparatus including a non-magnetic section in the track at each control station, an alternating current device carried by the vehicle and arranged in inductive relation with the track, a control inductor on the track at each control station associated with said non-magnetic track section and adapted to be rendered effective and ineffective, said device being affected by said inductor when the inductor is effective, and means controlled by said device to be brought to an operable condition whenever said device moves along the non-magnetic track section and operable, after such operable condition is established, to establish a predetermined vehicle condition if said device is affected by the inductor.

4. Vehicle controlling apparatus including a non-magnetic section in the track at each control station, a vehicle-carried alternating current responsive device in inductive relation with the track, means arranged to be released when said device moves along a non-magnetic track section, a control inductor on the track at each control station associated with the non-magnetic track section and having a magnetic member with with which said device is cooperable inductively when moving along the non-magnetic track section, said inductor having means for rendering the magnetic member effective and ineffective, and means controlled by said device to be brought to an operable condition when said firstnamed means is released and operable to establish a predetermined vehicle condition when the responsive device is affected by said inductor with the magnetic member thereof effective.

5. Vehicle controlling apparatus including a non-magnetic section in the track at each control station, a magnetic member at each control station associated with the non-magnetic track section, a vehicle-carried responsive device in inductive relation with the track, such inductive relation being interrupted whenever said device moves along a non-magnetic track section and being established in passing an inductor, means for rendering the inductor effective and ineffective with reference to said device, and means controlled by said device operable for producing a predetermined vehicle condition, after the aforesaid interruption of the inductive relation between the responsive device and track when said device moves along the non-magnetic track section and is affected by the inductor.

6. Vehicle controlling apparatus including a non-magnetic section in the track at each control station, a magnetic member at each control station associated with the non-magnetic track section, a vehicle-carried alternating current responsive device in inductive relation with the track to be inductively affected by said magnetic member whenever moving along the non-magnetic track section at a control station, means for rendering said magnetic member effective and ineffective, and means controlled by said device to be rendered operable whenever said device moves along a non-magnetic track section and then operable, after being rendered operable as aforesaid, for obtaining a predetermined vehicle condition if said device is affected by said magnetic member.

7. Vehicle controlling apparatus including a non-magnetic section in the track at each control station, a magnetic member at each control station associated with the non-magnetic track section, a vehicle-carried responsive device in inductive relation with the track and cooperable inductively with said magnetic member whenever said device moves along the non-magnetic track section, a choke coil on said magnetic member for preventing said magnetic member from being effective with respect to said device, means for opening and closing the circuit of said coil to render the magnetic member effective and ineffective, and means controlled by said device arranged to be operable whenever said device moves along a non-magnetic track section and then operable, after being rendered operable as aforesaid, for obtaining a predetermined vehicle condition if said device passes said magnetic member with the circuit of the choke coil opened.

8. Vehicle controlling apparatus including a non-magnetic section in the track at each control station, a plurality of control inductors on the track at each control station associated with the non-magnetic track section, means for rendering said inductors effective and ineffective, a vehicle-carried responsive device in inductive relation with the track and inductively cooperable with said inductors when the inductors are effective, and means controlled by the responsive device for obtaining operable conditions when said device moves along a non-magnetic track section and for obtaining different vehicle conditions when said device is inductively affected by different inductors.

9. Vehicle controlling apparatus including a non-magnetic section in the track at each control station, a plurality of control inductors on the track at each control station associated with the non-magnetic track section, a vehicle-carried responsive device in inductive relation with the track and adapted to cooperate inductively with said inductors when they are effective, means for rendering said inductors effective and ineffective, means arranged to be released when said device moves along a non-magnetic track section and operable according to the motion of the vehicle, means controlled by the secondnamed means when it is in different positions and controlled by said device so that said device being affected by the inductors at different positions of said device relatively to the non-magnetic track section will produce different vehicle conditions, and means for restoring the secondnamed means when said device returns to a magnetic portion of the track.

10. Vehicle controlling apparatus including a non-magnetic section in the track at each control station, an inductor at each control station associated with the non-magnetic track section, means for rendering the inductor effective and ineffective, a vehicle-carried responsive device in inductive relation with the track, a magnet controlled by said device to be rendered effective and ineffective by the inductive and non-inductive relation of said device with the track and inductor, a member normally held by the magnet and released when said device reaches a non-magnetic track section, means synchronizing the movement of said member with the movement of the vehicle, a second member movable with the firstnamed member, means normally latching said members together and for unlatching them when the firstnamed member has moved a predetermined amount with the responsive device approaching near to the inductor, the second member being under the influence of said magnet for separating it from the firstnamed member when said device is affected by the inductor, means for establishing a predetermined vehicle condition when said members are separated, and means operable for returning the firstnamed member to be held by said magnet when said device returns to a magnetic portion of the track.

11. Vehicle controlling apparatus including a non-magnetic section in the track at each control station, longitudinally spaced inductors at each control station associated with the non-magnetic track section, means for rendering the inductors effective and ineffective, a vehicle-carried responsive device in inductive relation with the track and cooperable inductively with said inductors while moving along the non-magnetic track section at a control station, a magnet controlled by said device to be rendered effective and ineffective when said device is in inductive and non-inductive relation with the track or inductors, a member normally held by said magnet and released when said device moves along a non-magnetic track section, means for synchronizing the movement of said member with the movement of the vehicle, members movable with the firstnamed member and under the influence of said magnet to be moved away from the firstnamed member when the lastnamed members are released and the magnet is rendered effective, means for producing different vehicle conditions by the separation of different lastnamed members from the firstnamed member, means for latching the lastnamed members to the firstnamed member and for unlatching the lastnamed members in succession as the responsive device approaches the inductors in succession, and means for returning the firstnamed member to be held by the magnet when the responsive device returns to a magnetic portion of the track.

12. Vehicle controlling apparatus including a non-magnetic section in the track at each control station, an inductor at each control station associated with the non-magnetic track section, means for rendering the inductor effective and ineffective, a vehicle-carried responsive device in inductive relation with the track and cooperable inductively with the inductor, a magnet controlled by said device to be rendered effective and ineffective when said device is in inductive and non-inductive cooperation with the track and inductor, a member normally held by the magnet and released when the responsive device moves along a non-magnetic track section, means driven in proportion to the movement of the vehicle for synchronizing the movement of said member to the movement of the vehicle, a second member movable with the firstnamed member and under the control of the magnet for separating the second member from the firstnamed member when the second member is released and the magnet is effective, means for producing a predetermined vehicle condition when said members are separated, means for latching said members together and for unlatching them when the firstnamed member has moved a predetermined amount, so as to release the second member when the responsive device approaches the inductor, a reciprocatory member, means operable for advancing said reciprocatory member when the firstnamed member is released, said reciprocatory and firstnamed members having cooperating portions for returning the firstnamed member to be held by the magnet when the responsive device has moved a distance to pass the non-magnetic track section at a control station, and means controlling said reciprocatory member to hold it in advanced position when the firstnamed member is released and for returning the reciprocatory member when the firstnamed member is restored to normal position.

13. Vehicle controlling apparatus including a non-magnetic section in the track at each control station, an inductor at each control station associated with the nonmagnetic section, means for rendering the inductor effective and ineffective, a vehicle carried responsive device in inductive relation with the track and cooperable inductively with the inductor when moving along the non-magnetic track section, a magnet controlled by said device to be rendered effective and ineffective when said device is in inductive and non-inductive relation with the track and inductor, a member normally held by the magnet and released when the responsive device moves along a non-magnetic track section to render the magnet ineffective, means for synchronizing the movement of said member to the movement of the vehicle, a second member movable with the firstnamed member and under the influence of said magnet to be separated from the firstnamed member when the second member is released and the magnet effective, means for producing a predetermined vehicle condition when said members are separated, means for latching said members together and unlatching them to release the second member when the firstnamed member has moved a predetermined amount with the responsive device approaching the inductor, a reciprocatory member arranged to return to initial position when released, a reciprocatory pawl to engage said reciprocatory member to advance it step by step, means for rendering said pawl effective when the firstnamed member has been released, a pawl to engage the reciprocatory member when the firstnamed member has been released for holding the reciprocatory member in its advanced positions, the reciprocatory member having ratchet teeth for the engagement of said pawls, and the firstnamed and reciprocatory members having portions for returning the firstnamed member to normal position when the reciprocatory member has been advanced a predetermined number of steps so as to return the firstnamed member when the responsive device moves beyond the non-magnetic track section.

14. Vehicle controlling apparatus including a vehicle-carried magnet, means for rendering said magnet effective and ineffective, a member normally held by the magnet and released when the magnet is ineffective, a second member movable with the firstnamed member and also under the control of the magnet for separating the second member from the firstnamed member when the firstnamed member has been released, means for latching said members together to prevent separation thereof and to unlatch said members when the firstnamed member has been released, means for restoring the firstnamed member to be held by said magnet, and means for producing a predetermined vehicle condition when said members are separated.

15. Vehicle controlling apparatus including a non-magnetic section in the track at each control station providing a primary control element, a secondary control element at each control station adapted to be rendered effective and ineffective, vehicle-carried responsive means inductively related with the track and cooperable with the secondary control elements when passing the control stations, and means controlled by said responsive means and having mechanism adapted to be brought into mechanical operation by the interruption of said inductive relation whenever passing a non-magnetic track section, the last named means being operable for obtaining a predetermined vehicle controlling condition by the response of said responsive means to the secondary control element, when in effective condition, at the corresponding control station after said mechanism is brought into operation.

16. Vehicle controlling apparatus including a non-magnetic section in the track at each control station providing a primary control element, a secondary control element at each control station adapted to be rendered effective and ineffective, vehicle-carried responsive means inductively related with the track and cooperable with the secondary control elements when passing the control stations, and mechanism controlled by said responsive means operable mechanically including means for obtaining an operative condition for a predetermined distance of travel of the vehicle whenever said responsive means is influenced by the interruption of said inductive relation when passing a non-magnetic track section at a control station, and means for obtaining a predetermined vehicle condition, during such distance of travel of the vehicle after such operative condition is established, when said responsive means responds to the corresponding secondary control element when in its effective condition.

17. Vehicle controlling apparatus including primary and secondary control elements at each control station of the track, a vehicle-carried responsive device cooperable inductively with said control elements, magnetic means controlled by said device to be rendered effective and ineffective, and mechanism controlled by said magnetic means and arranged to move in synchronism with the movement of the vehicle, when said device passes the primary control element, and to be resorted after a predetermined distance of movement of the vehicle, said mechanism including means conditioned for operation after a predetermined amount of movement of said mechanism and controlled by the magnetic means for obtaining a predetermined vehicle condition when the responsive device is affected by the secondary control element.

In testimony whereof I hereunto affix my signature.

ALFRED L. RUTHVEN.